(12) United States Patent
Chesnokov

(10) Patent No.: US 10,467,762 B2
(45) Date of Patent: Nov. 5, 2019

(54) METHOD FOR, AND DEVICE COMPRISING, AN ELECTRONIC DISPLAY

(71) Applicant: Apical Ltd, Cambridge (GB)

(72) Inventor: Viacheslav Chesnokov, Loughborough (GB)

(73) Assignee: Apical Limited, Cambridge (GB)

( * ) Notice: Subject to any disclaimer, the term of this patent is extended or adjusted under 35 U.S.C. 154(b) by 0 days.

(21) Appl. No.: 15/835,001

(22) Filed: Dec. 7, 2017

(65) Prior Publication Data

US 2018/0174305 A1  Jun. 21, 2018

(30) Foreign Application Priority Data

Dec. 21, 2016 (GB) .................................. 1621896.8

(51) Int. Cl.

| | |
|---|---|
| *G06F 3/01* | (2006.01) |
| *G06F 3/0484* | (2013.01) |
| *G06F 3/147* | (2006.01) |
| *G06T 7/20* | (2017.01) |
| *G06T 7/11* | (2017.01) |
| *G06F 1/16* | (2006.01) |
| *G09G 5/00* | (2006.01) |

(52) U.S. Cl.
CPC .............. *G06T 7/20* (2013.01); *G06F 1/1694* (2013.01); *G06F 3/012* (2013.01); *G06F 3/013* (2013.01); *G06F 3/04845* (2013.01); *G06T 7/11* (2017.01); *G09G 5/00* (2013.01); *G06F 3/147* (2013.01); *G06F 2200/1637* (2013.01); *G06T 2207/20* (2013.01); *G09G 2320/08* (2013.01); *G09G 2340/0407* (2013.01); *G09G 2340/0464* (2013.01)

(58) Field of Classification Search
CPC .... G06F 1/1694; G06F 3/04845; G06F 3/013; G06F 3/012; G06F 2200/1637; G06T 7/20; G06T 7/11; G06T 2207/20; G09G 5/00; G09G 2340/0464

See application file for complete search history.

(56) References Cited

U.S. PATENT DOCUMENTS

| | | | | |
|---|---|---|---|---|
| 9,478,045 B1* | 10/2016 | Hunnicutt | ............... | G06F 1/163 |
| 2009/0169127 A1* | 7/2009 | Lu | ........................... | G09G 3/007 |
| | | | | 382/255 |
| 2012/0320500 A1* | 12/2012 | Lee | ......................... | G06F 3/147 |
| | | | | 361/679.01 |

(Continued)

FOREIGN PATENT DOCUMENTS

CN  101630495 A1  1/2010

OTHER PUBLICATIONS

Combined Search and Examination Report dated May 5, 2017 for Application No. GB1621896.8.

*Primary Examiner* — Lin Ye
*Assistant Examiner* — John H Morehead, III
(74) *Attorney, Agent, or Firm* — EIP US LLP

(57) ABSTRACT

A method is provided. The method includes activating an anti-shake mode for an electronic display. The method includes, in response to activating the anti-shake mode, identifying movement of a user relative to the electronic display at least based on processing of a plurality of captured images of at least part of the user, and transforming an image displayed on the electronic display based on the identified movement of the user. A computing device is also provided.

20 Claims, 5 Drawing Sheets

(56) References Cited

U.S. PATENT DOCUMENTS

| | | | |
|---|---|---|---|
| 2015/0077323 A1* | 3/2015 | Ramaswamy | G06F 3/012 345/156 |
| 2015/0271408 A1* | 9/2015 | Cancel Olmo | G06F 3/013 348/208.6 |
| 2016/0026241 A1* | 1/2016 | Leung | H04M 1/72569 345/156 |
| 2016/0163024 A1* | 6/2016 | Chen | G06F 3/013 345/657 |

* cited by examiner

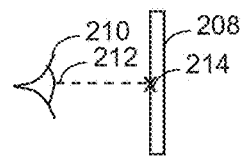
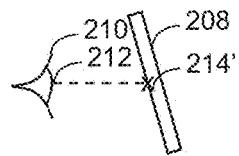
FIG. 4a  FIG. 4b
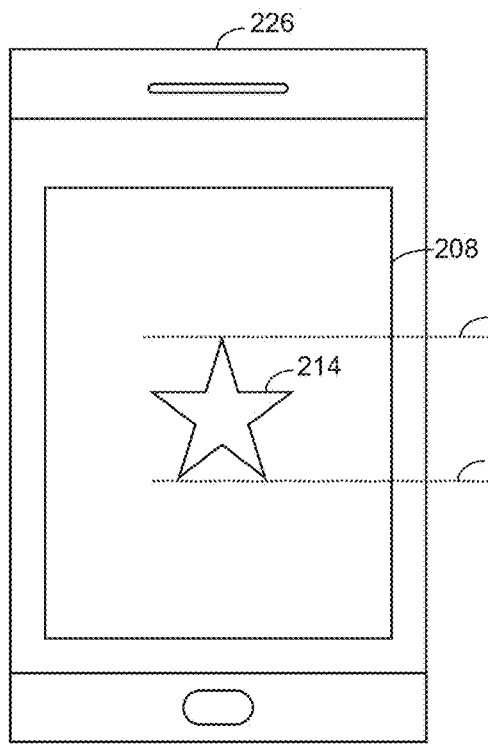
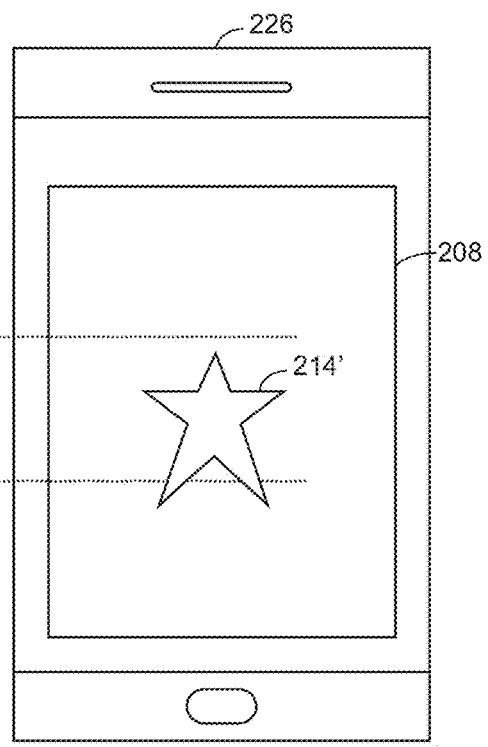
FIG. 5a  FIG. 5b

METHOD FOR, AND DEVICE COMPRISING, AN ELECTRONIC DISPLAY

CROSS-REFERENCE TO RELATED APPLICATIONS

This application claims priority to GB Application No. GB 1621896.8, filed Dec. 21, 2016, under 35 U.S.C. § 119(a). The above-referenced patent application is incorporated by reference in its entirety.

BACKGROUND

It can be difficult for a user to view a device comprising an electronic display, such as a hand-held or portable electronic device, while the user is moving. For example, if the user is using their electronic display during a bumpy journey, the display will shake, which can make it more difficult for the user to focus on the content.

It is desirable to provide a method and a module that can improve the viewing experience for a user viewing content on an electronic display.

SUMMARY

The present disclosure relates to a method for, and device comprising, an electronic display.

According to some embodiments, a method is provided. The method includes activating an anti-shake mode for an electronic display. The method includes, in response to activating the anti-shake mode, identifying movement of a user relative to the electronic display at least based on processing of a plurality of captured images of at least part of the user, and transforming an image displayed on the electronic display based on the identified movement of the user.

According to some embodiments, a computing device is provided. The computing device includes storage for storing image data representing an image. The computing device includes at least one processor communicatively coupled to the storage. The computing device includes an electronic display for displaying the image. The computing device includes an anti-shake module configured to, in response to activation of an anti-shake mode, identify movement of a user relative to the electronic display at least based on processing of a plurality of captured images of at least part of the user, and transform the image displayed on the electronic display based on the identified movement of the user

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein:

FIGS. 4a and 4b illustrate schematically a further example of movement of an electronic display relative to a user;

FIGS. 5a and 5b illustrate schematically an example of transforming an image displayed on the electronic display in response to the movement of the electronic display shown in FIGS. 4a and 4b;

DETAILED DESCRIPTION

Details of the method according to examples will become apparent from the following description, with reference to the FIGS. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples. For example, in certain cases, a description of conventional features is simplified or omitted in order to provide a concise explanation of the method according to examples.

Examples described herein provide a method including transforming an image displayed on an electronic display in response to activating an anti-shake mode for the electronic display. The image is transformed based on an identified movement of a user relative to the electronic display, which may be identified at least based on processing of a plurality of captured images of at least part of the user. The method may be implemented using a computing device or computing system, for example using an anti-shake module of the computing device or computing system.

Figure 1:
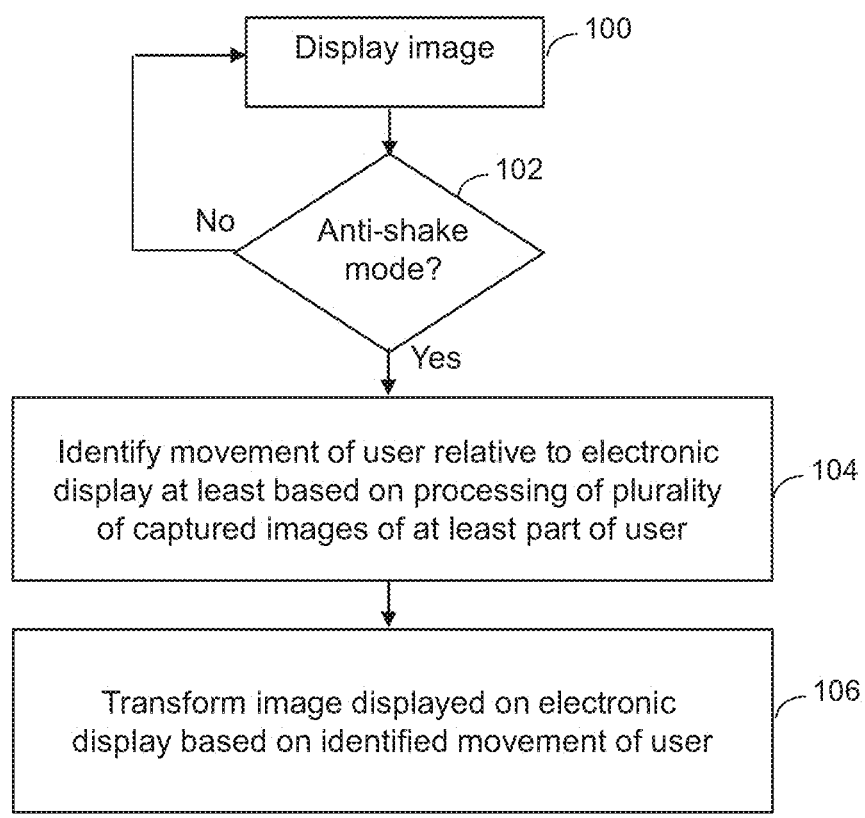
FIG. 1 is a flow diagram illustrating a method according to examples.

FIG. 1 is a flow diagram illustrating the method according to examples. The method of FIG. 1 includes displaying an image 100 on an electronic display. The electronic display is for example a display device of or coupled to a computing device or computing system, such as a hand-held or portable electronic device, and may be a touch-sensitive electronic display which is capable of receiving input via a user's touch on the display itself. The image may be the entire or whole image or a portion, part or subset of a larger image. The image is for example an image from a web page accessed by a browser of the computing device, such as a browser of a smartphone; an image captured by an image capture device, such as a camera, of the computing device; or an image downloaded to or stored in storage of the computing device. The image may include any graphical or visual content, for example text, graphics, pictures, and/or photographs. The image may be a still or moving image, such as a video image. The image may be represented by image data in any suitable format. Common formats include the JPEG (Joint Photographic Experts Group, ISO/IEC 10918) format, which is typically an 8-bit format, or the JPEG XT (ISO/IEC 18477) format, which is typically a more than 8-bit format.

The method further includes determining whether an anti-shake mode for the electronic display is activated 102. The anti-shake mode may be activated by a user of the electronic display, for example in situations in which the user anticipates that the electronic display is likely to shake, such as car journeys or if the user wants to use their electronic display while running on a treadmill at the gym. In other cases, however, the anti-shake mode may be activated automatically or based on processing of data obtained by the electronic display. Such data may include data indicative of an extent of shaking or movement of the electronic display, which may be obtained by components of the electronic display such as a gyroscope or accelerometer (described further below). Where this data indicates that the electronic display is being subjected to a certain amount of shaking, for example an amount of shaking above a threshold amount, or where the data indicates that the electronic display is in an environment in which shaking may be expected to occur, the anti-shake mode may be activated.

Shaking may be considered to refer to movement of the electronic display, either relative to a stationary state of the electronic display or relative to the user, typically with relatively short or rapid motions. Shaking does not necessarily require backward-and-forward motion or motion along solely one axis, such as up-and-down or side-to-side motion. Instead, shaking may involve jerky, non-linear or discontinuous motion of the electronic display, which may be in any direction. In some cases, though, shaking may include smooth movement of the electronic display. In examples, shaking may be considered to refer to a relatively small amount or magnitude of movement of the electronic display, such as movement of the electronic display by no more than 5% or 10% of the width or length of the electronic display. In such cases, shaking may be considered to be motion of the electronic display within certain bounds or parameters, for example referring to a deviation of a position of the electronic display from a nominal position up to a maximal deviation. Movement of the electronic display beyond this maximal deviation may thus not be considered to be shaking in these examples.

If the anti-shake mode is not activated, the electronic display continues to display the image in a normal display mode. For example, the image may be displayed without further processing or transformation, although processing or transformation of the image may occur in some cases.

If the anti-shake mode is activated, movement of a user relative to the electronic display is identified at least based on processing of a plurality of captured images of at least part of the user 104. For example, the movement of the user may identified solely based on the processing of the captured images or partly based on the processing of the captured images and partly based on other data or processing. The captured images may be captured using an image capture device such as a camera that may be integrated with or coupled to a computing device or computing system coupled to the electronic display. For example, such an image capture device may be arranged to take photos of the user at certain time intervals, which may be fixed or time varying. As shaking of the electronic display will typically involve rapid movement of the electronic display, in examples, the image capture device may be arranged to capture images of the at least part of the user at a relatively high frame rate, for example a frame rate of 60 frames per second or higher. A frame rate of 120 frames per second or higher than 120 frames per second is, for example, a suitable frame rate for capturing images of the user.

Analysis of the captured images can be performed to ascertain a change in position of the user relative to the electronic display. For example, where the image capture device is at a fixed or constant position with respect to the electronic display, a change in location of the user in an image frame captured by the image capture device may be indicative of a change in position of the user relative to the image capture device and a corresponding change in position of the user relative to the electronic display.

The example method of FIG. 1 further includes transforming the image displayed on the electronic display based on the identified movement of the user 106. For example, the image may be transformed in real time or as the image is displayed in order to compensate for the movement of the user, and hence of the electronic display relative to the user. In order to transform the image in real time or in near-real time, the frame rate of the electronic display may be relatively high. For example, if the electronic display is an organic light emitting diode (OLED) display, the frame rate may be around 600 frames per second, for example within 5% or 10% of 600 frames per second.

Any suitable transformation may be applied to the image to offset or counteract the movement of the electronic display relative to the user, as will be discussed further below with reference to FIGS. 2 to 6. For example, the image may be translated, scaled and/or deformed in one or two dimensions, although other transformations are possible in other examples.

Example methods such as that of FIG. 1 therefore allow the image to be transformed to improve a viewing experience for a user viewing the image on the electronic display, for example by compensating for the shaking of the electronic display. The image displayed on the electronic display may therefore appear relatively stable to the user. This can make it easier for a user to observe the image. For example, where the image includes text content, it may be easier for the user to parse the text than if these methods are not applied.

Furthermore, as the movement of the user is identified and the image is transformed in response to activating an anti-shake mode, flexibility is provided for the user. For example, the user may choose to activate the anti-shake mode based on various features or characteristics such as the nature of the image displayed on the electronic display, for example whether the image includes text or not, and the expected amount of shaking the electronic display is expected to undergo. In addition, as the anti-shake mode may not be active at all times, power consumption of the computing device coupled to the electronic display may be reduced as the processing of the plurality of captured images and the transforming of the image may not occur unless the anti-shake mode is activated.

Moreover, by identifying the movement of the user relative to the electronic display at least based on the processing of the plurality of captured images of the at least part of the user, the identified movement may be more accurate than for other methods of identifying movement. For example, the movement may be identified more accurately than if solely components of the computing device such as a gyroscope or accelerometer are used to identify the movement. This can improve the transformation of the image, to ensure the transformation of the image more accurately corresponds to, and compensates for, the identified movement of the user.

Figure 2A:
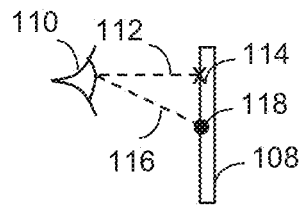
FIGS. 2a and 2b illustrate schematically an example of movement of an electronic display relative to a user.
Figure 2B:
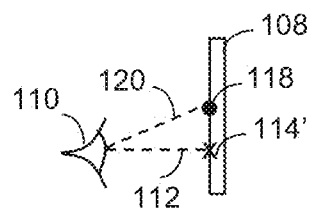

FIGS. 2a and 2b illustrate schematically an example of movement of an electronic display 108 relative to a user. The movement of the electronic display 108 is exaggerated in FIGS. 2a and 2b, for clarity. In practice, movement of the electronic display corresponding with shaking may be smaller, for example significantly smaller, than that shown in FIGS. 2a and 2b.

In FIG. 2a, the electronic display 108 is at a first position relative to the user 110, with a first distance 112 between the user 110 and an image 114 displayed on the electronic display 108 and a second distance 116 between the user 110 and the center 118 of the electronic display 108. In FIG. 2b, the electronic display 108 has moved relative to the user 110. There is now a third distance 120 between the user 110 and the center 118 of the electronic display 108.

However, in FIGS. 2a and 2b, the anti-shake mode is activated. Thus, the image 114' has been transformed in FIG. 2b relative to the image 114 of FIG. 2a based on identified movement of the user 110, which has been identified at least based on processing of a plurality of captured images of at least part of the user 110. An explanation of the identification of movement of the user from the processing of the plurality of captured images of the at least part of the user is given below with reference to FIGS. 7 and 8. In the example of FIGS. 2a and 2b, the image 114 has been moved from a first location 122 on the electronic display 108 to a second location 124 on the electronic display 108, different from the first location 122.

Figure 3:
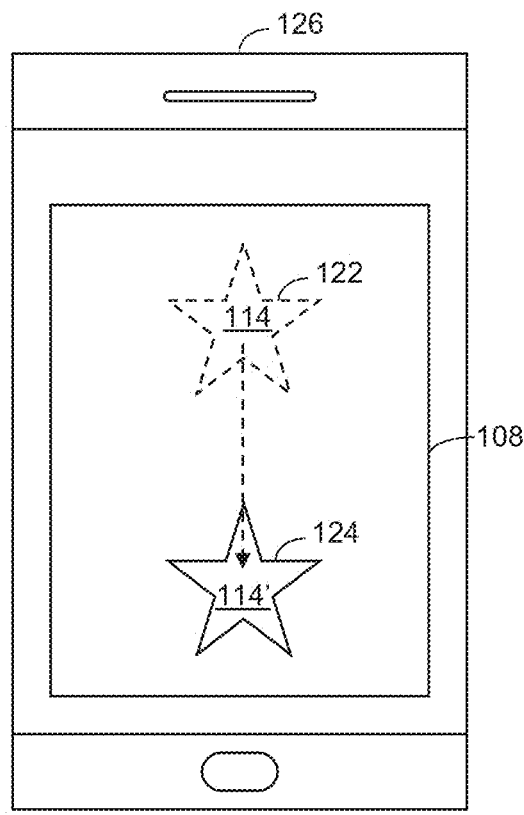
FIG. 3 illustrates schematically an example of transforming an image displayed on the electronic display in response to the movement of the electronic display shown in FIGS. 2a and 2b.

The first and second locations 122, 124 are further illustrated in FIG. 3, which shows a computing device 126, which in this example is a smartphone. Internal components of an example computing device such as the computing device 126 of FIG. 3 are described in further detail with reference to FIG. 9 below.

The computing device 126 of FIG. 3 includes an electronic display 108, which is the electronic display 108 also shown in FIGS. 2a and 2b. The image 114 displayed on the electronic display 108 is transformed from the first location 122 shown in FIG. 3 to the second location 124 shown in FIG. 3 in response to the movement of the electronic display 108 shown in FIGS. 2a and 2b. The transformation in this example involves a translation of the image 114 along a vertical axis. However, in other examples of the method, a two dimensional transformation may be applied to an image.

In the example of FIGS. 2a, 2b and 3, the entire image 114 has been moved from the first location 122 to the second location 124. However, in other examples, a portion of the image may be moved from the first location to the second location and a different portion of the image may not be moved. This may be the case where the image includes, for example, a border region surrounding further image content. In these cases, the border region may not be transformed in response to the movement of the electronic display. For example, the border region may remain static and/or unscaled despite movement of the electronic display relative to the user.

The method in examples may include transforming the image to maintain the image at a substantially constant viewing angle with respect to the user, for example a constant viewing angle, or a viewing angle that varies by less than 1 degree, 5 degrees or 10 degrees. FIGS. 2a, 2b and 3 illustrate such an example. As can be seen from a comparison of FIG. 2a and FIG. 2b, the first distance 112 between the user 110 and the image 114, 114' is the same in both FIGS. 2a and 2b, due to the transformation of the image to compensate for the movement of the user 110 relative to the electronic display 108. In FIGS. 2a and 2b, the image 114, 114' is maintained at a viewing angle of approximately zero degrees with respect to the user 110, although as will be appreciated the image may be maintained at other viewing angles with respect to the user in other examples. In this way, it may appear to the user that the image has not moved with respect to their viewing position, despite the relative movement of the electronic display. This can improve the viewing experience for the user, as the user does not have to change an eye position or angle to view the image. Instead, the user can continue to view the image from the same vantage point without having to move their head or their eyes.

The image or a portion of the image may be moved in substantially the same direction as the identified movement of the user, for example to continue to display the image at substantially the same viewing angle relative to the user. FIGS. 2a, 2b and 3 show an example in which the image is moved in the same direction as the user. Between FIGS. 2a and 2b, the electronic display 108 has moved in an upwards direction relative to the user 110. From the frame of reference of the electronic display 108, the user 110 has therefore moved in a downwards direction relative to the electronic display 108. The image 114' in FIG. 2b has also moved in a downwards direction on the electronic display 108 relative to the image 114 in FIG. 2a, i.e. after transformation of the image. In other words, the image 114 in this example is moved in substantially the same direction as the movement of the user, which may be for example within 1 degree, 5 degrees or 10 degrees of an angle of movement of the user relative to a particular axis such as a vertical axis.

Although the image in FIG. 3 is moved by a large amount relative to a length of the electronic display, typically the image may be moved by only small amounts, for example by less than 5% or 10% of the width or length of the electronic display. For example, the image may appear to be quasi-static to the user.

FIGS. 2a, 2b and 3 show a simple example in which the position of the electronic display is shifted or translated relative to the user, without a rotation or other movement of the electronic display. FIGS. 4a, 4b, 5a and 5b illustrate schematically a further example of movement of an electronic display relative to a user, which involves a rotation of the electronic display. Features of FIGS. 4a, 4b, 5a and 5b that are similar to or the same as corresponding features of FIGS. 2a, 2b and 3 are labelled with the same reference numerals incremented by 100; corresponding descriptions should be taken to apply.

FIGS. 4a, 4b, 5a and 5b illustrate an example in which an image 214 displayed on an electronic display 208 is transformed by deforming at least a portion of the image 214 in at least one direction. In this example, the deformation of the image 214 is intended to compensate for a rotation of the electronic display 208, although in other examples an image may be deformed to counteract other motions of the electronic display.

FIG. 4a shows the image 214 in a first position on the electronic display 208. The first position of the image 214 is coincident with the center of the electronic display (not labelled) in FIG. 4a and is therefore different from the first position of the image 114 of FIG. 2a, but otherwise the images 114, 214 are the same. The image 214 is at a first distance 212 from the user 210 in FIG. 4a. In FIG. 4b, the electronic display 208 has been tilted with respect to the user 210, in this case by pivoting or rotating the electronic display 208 around a point coincident with the center of the electronic display 208. The pivoting motion has caused the top of the electronic display 208 to move closer to the user 210 and the bottom of the electronic display 208 to move further from the user 210. In FIG. 4b, the image 214' has been transformed based on identified movement of the user 210. However, the center of the transformed image 214' of FIG. 4b remains at the same distance 212 with respect to the user 210 as in FIG. 4a, as the distance between the center of the electronic display 208 and the user 210 has not been changed by the movement of the electronic display 208 from FIG. 4a to FIG. 4b.

The transformation of the image 214, 214' of FIGS. 4a and 4b is illustrated further in FIGS. 5a and 5b. FIG. 5a and FIG. 5b show the image 214, 214' displayed on the electronic display 208 in the positions corresponding to FIGS. 4a and 4b, respectively. Illustrative lines 128, 130 have been drawn from the location of, respectively, the top and bottom of the image 214 in FIG. 5a to a corresponding location in FIG. 5b. As can be seen from FIG. 5b, both the top and the bottom of the image 214' has been shifted in a downwards direction compared to the image 214 of FIG. 5a. However, the center of the image 214, 214' has remained at approximately the same location. This is due to a deformation of the image to compensate for the movement of the electronic display 208 relative to the user.

As the center of the electronic display 208 (which in this example corresponds with the center of the image 214, 214') corresponds with a pivot point about which the electronic display 208 is rotated, the center of the image 214, 214' is not transformed. However, as parts of the electronic display 208 above the center are closer to the user 210 after the movement of the electronic display 208 and would thus appear larger if the image 214 was not transformed, the upper part of the image 214' has been deformed in FIG. 5b to make this part of the image 214' smaller to cancel out or reduce the effect of the rotation of the electronic display 208. Conversely, parts of the image 214' below the center have been enlarged to counteract the movement of the lower part of the electronic display 208 away from the user 210. In this way, the image 214, 214' may appear to the user to be at a substantially constant viewing angle with respect to the user 210 despite the rotational or pivoting movement of the electronic display 208.

Figure 6A:
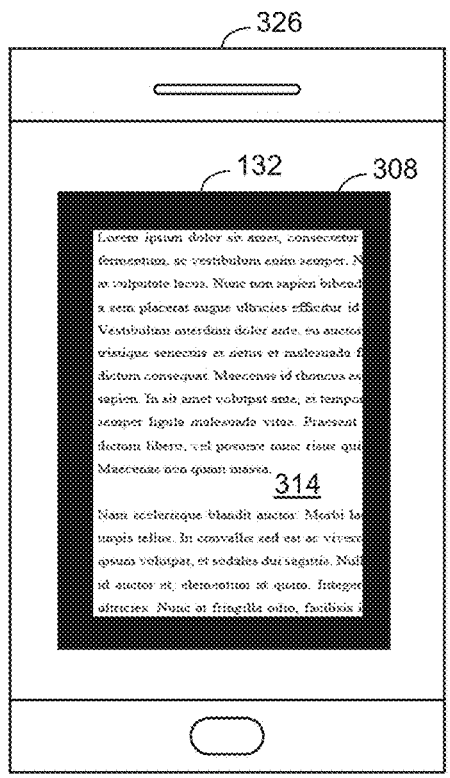
FIGS. 6a and 6b illustrate schematically a further example of transforming an image displayed on an electronic display.
Figure 6B:
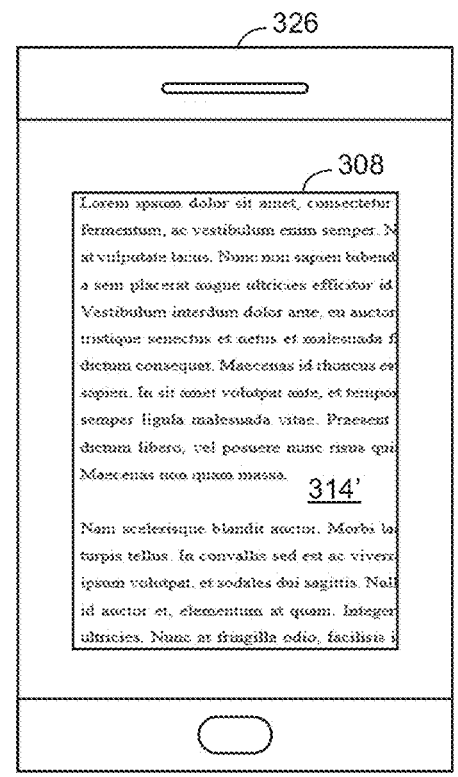

FIGS. 6a and 6b illustrate schematically a further example of transforming an image displayed on an electronic display. Features of FIGS. 6a and 6b that are similar to or the same as corresponding features of FIGS. 2a, 2b and 3 are labelled with the same reference numerals incremented by 200; corresponding descriptions should be taken to apply.

In the example of FIG. 6a, the image 314 is displayed on the electronic display 308 of a smartphone 326. The image 314 includes text content and a border area 132, which in this example is a plain black border area. In other examples, the border area may include other plain or neutral colors than black. The border area may correspond with a margin area, for example.

In FIGS. 6a and 6b, the transforming the image includes scaling at least a portion of the image. In the example of FIG. 6b, the image 314' has been scaled up in size, for example increased in size, so that the border area 132 of the image 314 displayed in FIG. 6a is no longer visible on the electronic display 308. In addition, other parts of the text content of the image 314 of FIG. 6a are also no longer displayed on the electronic display 308 due to the scaling of the image 314' in FIG. 6b. This may therefore correspond with the application of a zoom to the image, with the image 314' of FIG. 6b being a zoomed-in version of the image 314 of FIG. 6a.

The image may be scaled as in the example of FIGS. 6a and 6b upon initiating the anti-shake mode. With this mode activated, the image 314 may be zoomed in on, so that the part of the image 314' displayed on the electronic display 308 after the transformation is larger than prior to activation of the anti-shake mode. With this zoomed in view of the image 314', the image 314' may then be further transformed, for example translated, based on the identified movement of the user. For example, image data corresponding with a zoomed-in version of the image 314' may be stored in memory of the computing device 326 in order to speed up the transformation of the image 314. The amount of zoom applied to the image, or the extent to which the image is scaled, may depend on the amount or magnitude of shaking the electronic display is or is expected to be subjected to. For example, a dynamic zoom may be applied to the image, so that a larger zoom or scaling is applied in situations in which the electronic display undergoes or is expected to undergo a relatively high magnitude of shaking, for example a relatively large change in position compared with a width or length of the electronic display. In other examples, it may be possible to switch between various different zoom or scaling modes corresponding with different shaking modes, either based on a user input or based on an analysis of the shaking of the electronic display, for example at based at least partly on processing of the plurality of captured images. There may be a high frequency and low amplitude shaking mode in which the movement of the electronic display is high frequency but low amplitude or magnitude and a low frequency and high amplitude shaking mode in which the electronic display moves slowly but by a large amount. The high frequency and low amplitude shaking mode may for example correspond with a smaller or lesser amount of zoom or scaling than the low frequency and high amplitude shaking mode. Changing the zoom applied to the image may require a relatively large amount of power. In such cases, the zoom may only be applied or altered for example where the electronic display or computing device has sufficient power or is plugged into the mains.

In examples, the method may include, in response to reaching a predetermined transformation threshold for transforming the image, ceasing to transform the image further. The predetermined transformation threshold may be a threshold beyond which a border area or other part of the image becomes visible. For example, referring to FIG. 6b, the image 314 may be translated or otherwise transformed until the border area 132 would become visible. At that point, the transformation may stop and the image 314' may not be transformed further. This allows the method to constrained, to avoid excessive alterations to the image, which may be visible and distracting to the user.

Figure 7:
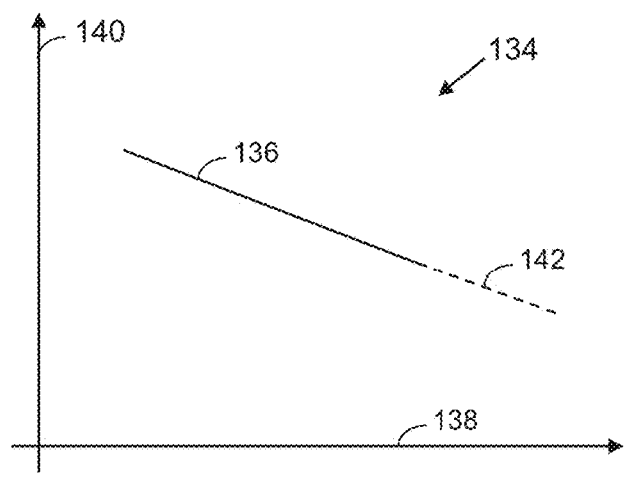
FIG. 7 is a graph illustrating a model of movement of a user according to examples.

Referring now to FIG. 7, this Figure will be used to explain how the movement of the user relative to the electronic display is identified. The movement of the user in examples is identified at least based on processing of a plurality of captured images of at least part of the user. The plurality of captured images may be of the user at a plurality of time points, for example based on a plurality of frames of the at least part of the user. The captured images may be analyzed to extract keypoints, which typically represent distinctive features of the captured images. For example, keypoints may correspond or be associated with particular facial features of a user's face such as a user's eye, nose or mouth. Keypoints of the image may be tracked over the plurality of captured images, such as a series of consecutive images of the user, to determine whether the keypoints have travelled or moved, and the extent to which the keypoints have moved, between the captured images. For example, a non-linear algorithm such as the Kalman filter may be used for object tracking, as the skilled person will appreciate.

Such an algorithm may be used to perform eye or head tracking of the user between different frames captured by the image capture device.

The extent to which the keypoints have been moved may be used to transform the image. For example, from an analysis of the keypoints of the captured images, if it is determined that the user has moved from a first position to a second position over a distance X in the x or horizontal direction and over a distance Y in the y or vertical direction, for example to a new position (X, Y) if the first position corresponds to the origin, the image displayed by the electronic display may also be moved by X in the x or horizontal direction and by Y in the y or vertical direction. With this method of transforming the image, there may therefore be a time lag between the user's position, due to the time taken to process the captured images to determine that the use has moved to new position (X, Y), and the transformation of the image. To avoid this time lag adversely affecting the display quality, the processing of the captured images is typically carried out rapidly, so that any lag is imperceptible to the user. For example, the processing of the captured images may be implemented using hardware, which may be dedicated hardware for performing this image processing and which may have a lower power consumption than a software implementation.

In further examples, however, the method may include deriving, based on the identified movement of the user, a model of the movement of the user and transforming the image based on the model of the movement of the user. In these examples, the method may further include predicting a future position of the user from the model of the movement of the user and transforming the image based on the predicted future position of the user.

FIG. 7 illustrates such an example. FIG. 7 is a graph 134 illustrating an example model 136 of movement of a user. The x-axis 138 of the graph 134 corresponds with a calculated x-coordinate of the position of the user at a point in an image and the y-axis 140 of the graph 134 corresponds with a calculated y-coordinate of the position of the user at that point in the image. From calculated x and y positions of the user relative to the electronic display based on the processing of the captured images of the user at a series of time points, a model of the motion of the user relative to the electronic display may be extracted. FIG. 7 illustrates a simple example in which the user is moving at a constant speed in a constant direction, however in other examples the model of the movement of the user may be more complex.

The model of the movement of the user may be extrapolated 142 to predict where the user will move to in the future. In these examples, rather than transforming the image based on the measured position of the user relative to the electronic display, the image may instead be transformed based on the predicted future position of the user. Providing the model of the movement of the user is relatively accurate, which may depend on the complexity and nature of the user's movements with respect to the electronic display and how easily they may be parameterized or modelled, this can further improve the stability of the image on the electronic display with respect to the user.

Figure 8:
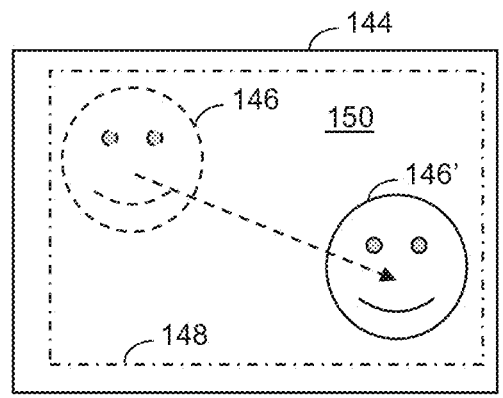
FIG. 8 illustrates schematically an example of processing of captured images of at least part of a user.

FIG. 8 illustrates schematically an example of processing of captured images of at least part of a user. The at least part of the user may be the entirety of a user or a part of the user. For example, the captured images may be of all or part of the user's face or eyes. FIG. 8 shows two captured images 144 of a head of a user. The two images 144 are overlaid to illustrate the different position of the head of the user in a first position 146 in a first captured image and in a second position 146' in a second captured image. The movement of the head of the user in FIG. 8 has been exaggerated for illustration.

In examples such as that of FIG. 8, the method may include extracting a region of interest from each of the plurality of captured images of the at least part of the user of the electronic display. In these examples, the movement of the user relative to the electronic display may be identified at least based on processing of the region of interest from each of the plurality of captured images. In FIG. 8, the region of interest 148 includes the user's head in both the first and second positions 146, 146', although in other examples the region of interest may be different in different captured images of the plurality. For example, the method may include extracting a region of interest corresponding to a human face or a human eye or eyes from each of the plurality of images, using any suitable segmentation and facial recognition image processing methods.

By processing regions of interest of the captured images rather than entire images, the method may be quicker to implement and may require less memory for storage, as for example the remainder of the captured images that are not part of the regions of the interest may be discarded. For example, solely the data corresponding to the identified regions of interest may be transferred from the image capture device to the computing device.

In examples such as that of FIG. 8, the plurality of captured images may be of at least part of a user and a background. In such examples, the identifying the movement of the user relative to the electronic display may be further based on identifying movement of the at least part of the user relative to the background. The background 50 is illustrated schematically in FIG. 8. The movement of the user may be identified by ascertaining a difference in position or size of the at least part of the user 146, 146' with respect to some or all of the background 50 between various of the captured images. This may be performed by segmenting the image into a foreground portion, for example corresponding with the at least part of the user, and a background portion, and performing object tracking to identify a relative movement between the foreground portion and the background portion. In this way, the movement of the user may be determined with relative accuracy, allowing the image to be transformed appropriately to compensate for the movement. For example, the processing of the plurality of captured images may be sufficiently sophisticated and robust that a rotation of the electronic display relative to the user may be distinguished from a shift of the electronic display relative to the user. For example, a rotation may correspond with a deformation of the at least part of the user in the captured images, such as a change in the distance between facial features such as eyes, nose and mouth of the user. In contrast, no or little deformation of facial features of the user may accompany a shift or translation of the electronic display relative to the user.

Figure 9:
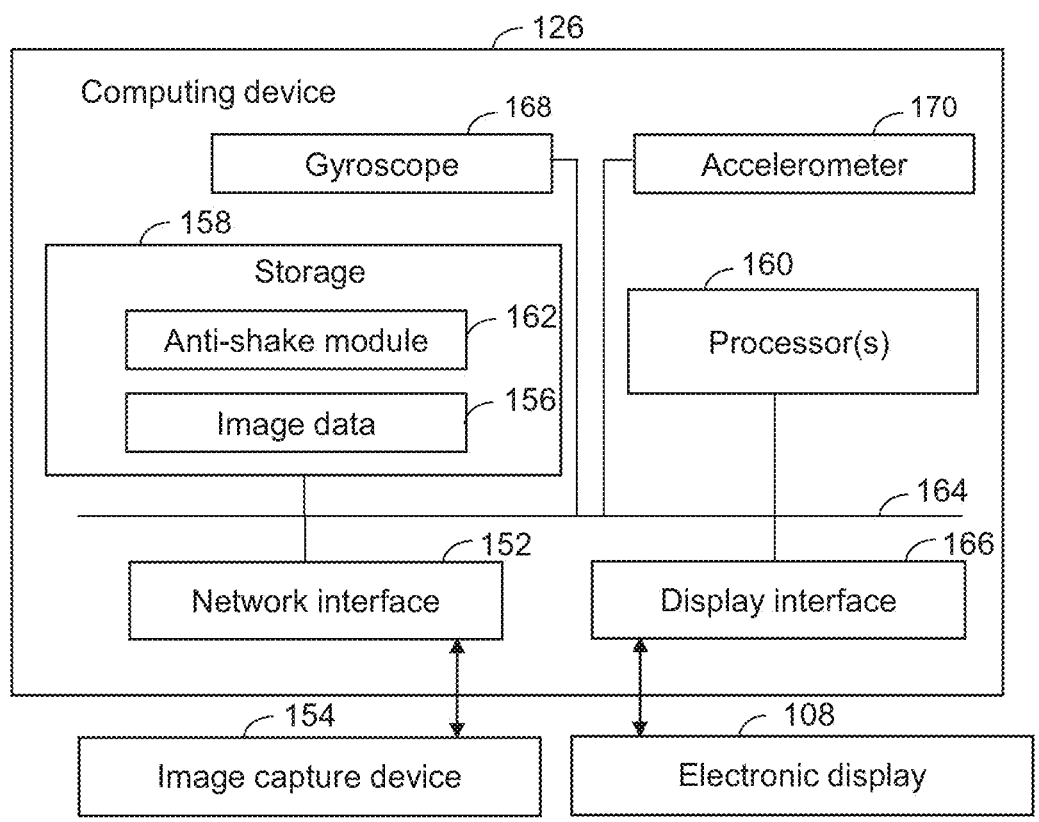
FIG. 9 is a schematic diagram showing an example of internal components of a computing system.

FIG. 9 is a schematic diagram showing an example of internal components of a computing system, which includes the computing device 126 of FIG. 1.

The computing device 126 of FIG. 9 includes a network interface 152, which is arranged to receive, from an image capture device 154, image data 156 representing an image. The network interface 152 of the computing device 126 may include software and/or hardware components, such as a virtual network interface, an Ethernet port, a software driver and/or communications stack interacting with network hardware. The image capture device 154 may be or include, amongst others, a camera or a video camera. In examples, the image capture device 154 is arranged for capturing a plurality of images of at least part of a user. For example, the image capture device 154 may be located in a position such that the user would be visible to the image capture device 154 when the user is in a nominal position for using the computing device 126. Although the computing device 126 in FIG. 9 is a smartphone, in other examples methods described herein may be performed using other computing devices such as a television with processing capabilities, such as a so-called "smart TV", a tablet, laptop or personal computer, a personal digital assistant, as well as various other electronic devices.

Storage 158 of the computing device 126 in the example of FIG. 9 stores the image data 156 received at the network interface 152. The storage 158 may include at least one of volatile memory, such as a Random Access Memory (RAM) and non-volatile memory, such as Read Only Memory (ROM) or a solid state drive (SSD) such as Flash memory. The storage 158 in examples may include further storage devices, for example magnetic, optical or tape media, compact disc (CD), digital versatile disc (DVD) or other data storage media. The storage 158 may be removable or non-removable from the computing device 126.

At least one processor 160 is communicatively coupled to the storage 158 in the computing device 126 of FIG. 9. The at least one processor 160 in the example of FIG. 9 may be a microprocessor, a general-purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The at least one processor 160 may also be or include at least one graphics processing unit (GPU) such as an NVIDIA® GeForce® GTX 980, available from NVIDIA®, 2701 San Tomas Expressway, Santa Clara, Calif. 95050, USA, although other processors are possible. For example, in one case the computing device may include a thin terminal with graphics processing capabilities; in other cases the computing device may include a computing device comprising at least one central processing unit (CPU) and at least one graphics processing unit.

The storage 158 in the example of FIG. 9 includes an anti-shake module 162. The anti-shake module 162 is configured to, in response to activation of an anti-shake mode, identifying movement of a user relative to the electronic display 108 at least based on processing of a plurality of captured images of at least part of the user, and transform an image displayed on the electronic display 108 based on the identified movement of the user.

The anti-shake module 162 may be implemented as hardware, as software, or as a combination of hardware and software. Where the anti-shake module 162 is at least partly implemented as software, the storage 158 may include computer program instructions operable to, when processed by the at least one processor 160, implement the anti-shake module 162. The computer program instructions may be stored in an accessible non-transitory computer-readable medium and loaded into memory, for example the storage 158, to implement the anti-shake module 162. In examples, the storage 158 and the computer program instructions are operable to, with a graphics processing unit of the storage 158, implement at least part of the anti-shake module 162. For example, use of the graphics processing unit may allow for parallel processing of multiple operations for processing of the plurality of captured images, improving the speed at which the image may be transformed appropriately.

The components of the computing device 126 in the example of FIG. 9 are interconnected using a systems bus 164. This allows data to be transferred between the various components. For example, image data 156 representing the image may be stored in the storage 158 and subsequently transmitted via the systems bus 164 from the storage 158 to a display interface 166 for transfer to the electronic display 108 for display. The display interface 166 may include a display port and/or an internal electronics interface, e.g. where the t electronic display 108 is part of the computing device 126 such as a display screen of a smartphone. Therefore, when instructed by the at least one processor 160 via the display interface 166, the electronic display 108 will display an image based on the image data.

The electronic display 108 may be a touch-sensitive electronic display, such as a conventional touchscreen. For example, the touch-sensitive electronic display 108 may be or include a resistive touchscreen panel or a capacitive touchscreen panel configured to detect one or more touches of an input or proximity of the input that occur at various locations on the panel to produce signals representative of a location of the input for each of the touches. In examples, the electronic display is a two-dimensional display for displaying two-dimensional images. In such examples, the electronic display is therefore not operable to display three-dimensional images or images that are perceived or experienced as three-dimensional by a user.

The computing device 126 of FIG. 9 also includes a gyroscope 168 and an accelerometer 170. In this way, computing devices such as that of FIG. 9 may be operable to implement a method according to the examples described above and further including receiving orientation data indicative of an orientation of the electronic display and identifying the movement of the user relative to the electronic display further based on the orientation data. For example, a gyroscope 168 may be used to determine the angle of the electronic display for example relative to a fixed axis such as a horizontal or vertical axis. An accelerometer 170 may be used to measure the acceleration of the electronic display. This additional information may be combined with the identified movement obtained from the processing of the plurality of captured images of the at least part of the user, to further refer the identified movement of the at least part of the user. As will be appreciated, in other examples components other than a gyroscope and an accelerometer may be used to obtain orientation data for the electronic display.

The above examples are to be understood as illustrative examples. Further examples are envisaged.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method comprising:
   activating an anti-shake mode for an electronic display;
   in response to activating the anti-shake mode:

identifying movement of a user relative to the electronic display at least based on processing of a plurality of captured images of at least part of the user;

deriving, based on the identified movement of the user, a model of the movement of the user; and transforming an image displayed on the electronic display based on the model of the movement of the user.

2. The method according to claim 1, wherein the transforming the image comprises transforming the image to maintain the image at a substantially constant viewing angle with respect to the user.

3. The method according to claim 1, wherein the transforming the image comprises moving a portion of the image from a first location on the electronic display to a second location on the electronic display, different from the first location.

4. The method according to claim 3, wherein the moving the portion of the image comprises moving the portion of the image in substantially a same direction as the identified movement of the user.

5. The method according to claim 1, wherein the transforming the image comprises deforming at least a portion of the image in at least one direction.

6. The method according to claim 1, wherein the transforming the image comprises scaling at least a portion of the image.

7. The method according to claim 1, comprising:

in response to reaching a predetermined transformation threshold for transforming the image, ceasing to transform the image further.

8. The method according to claim 1, wherein the electronic display is a two-dimensional display.

9. The method according to claim 1, wherein the image comprises text content.

10. The method according to claim 1, comprising receiving orientation data indicative of an orientation of the electronic display, wherein the identifying the movement of the user relative to the electronic display is further based on the orientation data.

11. The method according to claim 1, comprising predicting a future position of the user from the model of the movement of the user, the transforming the image based on the predicted future position of the user.

12. The method according claim 1, comprising extracting a region of interest from each of the plurality of captured images of the at least part of the user of the electronic display, the identifying the movement of the user relative to the electronic display at least based on processing of the region of interest from each of the plurality of captured images.

13. The method according to claim 1, wherein the plurality of captured images are of the at least part of the user and a background, the identifying the movement of the user relative to the electronic display further based on identifying movement of the at least part of the user relative to the background.

14. A computing device comprising:

storage for storing image data representing an image;

at least one processor communicatively coupled to the storage;

an electronic display for displaying the image; and an anti-shake module configured to, in response to activation of an anti-shake mode:

identify movement of a user relative to the electronic display at least based on processing of a plurality of captured images of at least part of the user;

derive, based on the identified movement of the user, a model of the movement of the user; and transform the image displayed on the electronic display based on the model of the movement of the user.

15. The computing device according to claim 14, comprising an image capture device for capturing the plurality of images of the at least part of the user.

16. The computing device according to claim 14, wherein the computing device is a mobile phone, a tablet, a laptop, a personal computer, or a personal digital assistant.

17. The computing device according to claim 14, wherein the anti-shake module is configured to transform the image to maintain the image at a substantially constant viewing angle with respect to the user.

18. The computing device according to claim 14, wherein the anti-shake module is configured to move a portion of the image from a first location on the electronic display to a second location on the electronic display, different from the first location.

19. The computing device according to claim 14, wherein the anti-shake module is configured to, in response to reaching a predetermined transformation threshold for transforming the image, cease to transform the image further.

20. The computing device according to claim 14, wherein the plurality of captured images are of the at least part of the user and a background, and the anti-shake module is configured to identify the movement of the user relative to the electronic display further based on identifying movement of the at least part of the user relative to the background.

\* \* \* \* \*